United States Patent [19]

Ishikawa et al.

[11] Patent Number: 5,060,201

[45] Date of Patent: Oct. 22, 1991

[54] PROBE FOR ULTRASONIC MICROSCOPE

[75] Inventors: Isao Ishikawa, Takasaki; Takuya Semba, Fukuoka; Yasuhiro Tani; Hisayoshi Sato, both of Tokyo, all of Japan

[73] Assignee: Hitachi Construction Machinery Co., Ltd., Tokyo, Japan

[21] Appl. No.: 522,897

[22] Filed: May 14, 1990

[30] Foreign Application Priority Data

May 12, 1989 [JP] Japan ............................... 1-119994
Apr. 26, 1990 [JP] Japan ............................... 2-108742

[51] Int. Cl.$^5$ .................................................. G01N 29/00
[52] U.S. Cl. .......................................... 367/7; 367/138; 73/642
[58] Field of Search ............ 367/7, 11, 150, 152, 367/81, 138; 128/663.01; 73/617, 627, 642, 606; 181/176, 184

[56] References Cited

U.S. PATENT DOCUMENTS 4,655,083  4/1987  Chubachi ........................... 73/627

Primary Examiner—Daniel T. Pihulic
Attorney, Agent, or Firm—Wegner, Cantor, Mueller & Player

[57] ABSTRACT

A probe for an ultrasonic microscope is disclosed. The probe has an element for radiating and receiving an ultrasonic wave and an acoustic lens for causing an ultrasonic wave, which has been generated by the element, to converge at a point into an ultrasonic beam, whereby the ultrasonic beam is radiated against a sample and a reflected wave of the thus-radiated ultrasonic beam is received by the element to convert the reflected wave into an electrical signal proportional to the reflected wave. A mask is provided on a side of the sample relative to the acoustic lens. The mask is composed of an ultrasonic wave transmitting portion and an ultrasonic wave blocking portion. The transmitting portion permits the transmission of first beam components, which take part in producing an elastic surface wave in one direction in a surface layer of the sample, and second beam components which take no part in the production of any elastic surface wave. The blocking portion substantially reduces the transmission of third beam components, which take part in producing elastic surface waves in directions other than said one direction in the surface layer of the sample.

12 Claims, 6 Drawing Sheets

PROBE FOR ULTRASONIC MICROSCOPE

BACKGROUND OF THE INVENTION

1) Field of the Invention

The present invention relates to a probe suitable for use in an ultrasonic microscope which irradiates a sample with converging ultrasonic beam to measure and analyze acoustic characteristics of the sample on the basis of a reflected wave of the ultrasonic beam.

2) Description of the Related Art

Ultrasonic microscopes have been increasingly used in recent years as a means for determining physical properties of a surface layer of an object (sample), for example, the thickness of the surface layer, the magnitude of residual stress occurring in the vicinity of a joint interface, residual stress in a machined layer or residual stress in crystal grains, etc. These ultrasonic microscopes will be described in brief with reference to some of the accompanying drawings.

FIG. 1 is a simplified block diagram of a conventional ultrasonic microscope. In the drawing, letters X, Y and Z indicate coordinate axes. Of these, the Y-axis extends in a direction perpendicular to the drawing sheet. Designated at numeral 1 is an ultrasonic probe which is constructed of a piezoelectric element 1a and an acoustic lens 1b attached to the piezoelectric element 1a. The acoustic lens 1b has a semispherical lens 1c in a bottom surface thereof. There are also shown a sample 2 as an object of inspection by the ultrasonic microscope, a susceptor 3 for mounting the sample 2 thereon, a Y-axis scanning device 4 for moving the susceptor 3 in the direction of Y-axis, and an X-Y positioning device for positioning the sample 2 along X-axis and Y-axis. Numeral 6 indicates a scanning control unit, which controls the driving of the X-Y positioning device 5 and Y-axis scanning device 4 and also controls the driving of the sensor 1 in the directions of X-axis and Z-axis. Incidentally, the illustration of a drive mechanism for the sensor 1 is omitted in the drawing. Also illustrated are a liquid medium interposed between the sensor 1 and the sample 2, e.g., water, a high frequency (HF) pulse generator 9 for applying a high frequency pulsating voltage to the piezoelectric element 1a, a receiver for receiving and processing a signal from the piezoelectric element 1a, and a display 11 for performing display on the basis of a signal processed by the receiver 10.

FIG. 2 is a perspective view of the sensor 1 shown in FIG. 1. In FIG. 2, like elements similar to those shown in FIG. 1 are indicated by like reference numerals or symbols. As is apparent from the drawing, an ultrasonic wave generated at the piezoelectric element 1 propagates through the acoustic lens 1b and by the lens surface 10 in a lower portion of the acoustic lens 1b, is caused to converge into a converging ultrasonic beam B which converges at one point. The sample 2 is then irradiated by the converging ultrasonic beam B.

When a pulsating voltage is applied from the high frequency pulse generator 9 to the piezoelectric element 1a, the piezoelectric element 1a generates an ultrasonic wave. As is illustrated in FIGS. 1 and 2, this ultrasonic wave is caused to converge by the acoustic lens 1b and is radiated as the converging ultrasonic beam B. This ultrasonic beam B is irradiates the sample 2, and a reflected wave of the ultrasonic beam B travels backward along the radiation path and reaches the piezoelectric element 1a. Upon arrival of the reflected wave, the piezoelectric element 1a outputs an electrical signal proportional in magnitude to the reflected wave. After the receiver 10 has received, magnified and detected the electrical signal, the resultant signal is used as an intensity modulation signal so that an image of a single picture element corresponding to the electrical signal (an ultrasonic microscope image) is displayed on the display 11. By moving the sample 2 with the scanning control unit 6 and performing two-dimensional scanning with the ultrasonic beam B, a complete ultrasonic image can be obtained.

In recent years, means have been developed for investigating physical properties of a surface layer of the sample 2 (for evaluating the surface of a material) by using a converging ultrasonic beam as described above. One example of these means will hereinafter be described. When the above operation is performed while moving the sensor 1 toward the sample 2 in the direction of the Z-axis, signals are outputted from the piezoelectric element 1a, with a waveform as shown in FIG. 3. In FIG. 3, distances (Z) between the sensor 1 and the sample 2 in the direction of Z-axis are plotted along the axis of abscissas while the voltage levels (V) of signals outputted from the piezoelectric element 1a are plotted along the axis of ordinates. The distance (Z) between the sensor 1 and the sample 2 is set 0 at a certain specific position of the sensor 1, positive in the direction departing from the sample, and negative in the direction approaching the sample. The waveform shown in FIG. 3 is called a "V(Z) curve", which varies with a constant period $\Delta Z$ when the sensor 1 is approaching the sample 2 beyond a certain particular distance.

Variations of the V(Z) curve with the period $\Delta Z$ take place because, when the ultrasonic beam B is radiated against the sample 2, an elastic surface wave is developed in the surface layer of the sample 2 by certain components of the ultrasonic beam, said components having entered at a critical angle which is determined by the acoustic impedance of the medium (water) 7 and that of the sample 2, and a reflected wave of the elastic surface wave interferes with a reflected wave of the ultrasonic beam B. The degree of this interference successively changes depending on variations of the propagation distance of the elastic surface wave, which variations takes place as the sensor 1 is displaced in the direction of the Z-axis. The period $\Delta Z$ caused by the above variations is in a certain relationship with the propagation velocity of the above elastic surface wave through the surface layer of the sample 2. The propagation velocity $V_R$ of the elastic surface wave is therefore represented by the following formula:

$$V_R = V_w (\Delta Z / \lambda_w)^{\frac{1}{2}} \tag{1}$$

where $V_w$: acoustic velocity through the liquid medium 7, and $\lambda_w$: wavelength of acoustic wave through the liquid medium 7.

Since the values $V_w, \lambda_w$ are known in the formula (1), the propagation velocity $V_R$ of the elastic surface wave can be obtained once the period $\Delta Z$ is determined from the V(Z) curve. Further, this propagation velocity $V_R$ varies depending on physical properties of the surface layer of the sample 2. It is therefore possible to determine the physical properties of the surface layer of the sample 2 on the basis of the propagation velocity $V_R$. When the surface of the sample 2 is a machined surface, by way of example, the residual stress and thickness of the machined layer can be determined.

Incidentally, physical properties differ from one material body to another. It is desirable to permit measurement of such physical properties by an ultrasonic microscope whatever the material body is. For example, there are some material bodies whose crystalline structures are anisotropic. Even on such material bodies, predetermined measurements must be performed by an ultrasonic microscope. It is however difficult to perform such measurements using a conventional ultrasonic microscope making use of a point-converging beam. Namely, the detection of the above V(Z) curve is effected at a very small area of the sample 2. The components of the ultrasonic beam B at the radiated area are however distributed in all directions around the central axis of the beam, i.e., the beam axis. The acoustic velocity of the resulting elastic surface wave is therefore the average value of acoustic velocities in all the directions, thereby making it impossible to measure the sample 2 where the sample 2 is anisotropic.

FIG. 4 is a perspective view of a special sensor for the measurement of a sample having such anisotropy. In the drawing, there are illustrated a rectangular piezoelectric element $1a'$ and an acoustic lens $1b'$. Since the acoustic lens $1b'$ is also formed in a rectangular shape, a concave surface $1c'$ formed in a lower part of the acoustic lens $1b'$ substantially defines a semi-cylindrical surface. The semi-cylindrical surface, of this sensor causes an ultrasonic beam to converge in the widthwise direction of the acoustic lens $1b'$. As a consequence, the sensor can cause the ultrasonic beam to converge into a linear ultrasonic beam which extends in the direction of only one axis, i.e. in the lengthwise direction of the acoustic lens $1b'$. When the sample 2 is rotated as indicated by an arrow and the propagation velocity of an elastic surface wave is measured at predetermined angular intervals, the anisotropy of the sample 2 can be determined and, further, the propagation velocity of the elastic surface wave in each of the corresponding radial directions can be measured.

The sensor depicted in FIG. 4 is however accompanied by the problem that labor and time are required for the replacement of the sensor itself. It also involves the following additional problems. This sensor has a structure permitting convergence along only one axis, whereby there is a limitation to the reduction of the length L of the acoustic lens $1b'$ in the longer axis thereof. Because of this limitation, their length L is generally about 2 mm. Thus, ultrasonic information available from this sensor is an average value over the 2 mm length. One of the characteristics of an ultrasonic microscope resides in that it can determine the elastic properties of a material on the basis of an extremely small area of the material. From this viewpoint, the radiation area as large as 2 mm on the sample 2 makes it absolutely impossible to exhibit the characteristic features of the ultrasonic microscope.

In addition, the surface of the sample 2 and the plane of convergence of the linear ultrasonic beam must be completely parallel to each other at the time of measurement. Formation of a slightest angle therebetween results in an error in the accuracy of measurement. the largest allowable angle tolerance is 1/100 degree. A time-consuming adjustment is usually required to control the angle not greater than the tolerance.

SUMMARY OF THE INVENTION

An object of the present invention is therefore to overcome the problems of the conventional art and to provide a probe for an ultrasonic microscope which probe permits measurement of an elastic surface wave in a very small area of a sample without the need for replacement of the probe itself.

To achieve the above object, the present invention provides a probe for an ultrasonic microscope, said probe having an element for radiating and receiving an ultrasonic wave and an acoustic lens for causing an ultrasonic wave, which has been generated by the element, to converge at a point into an ultrasonic beam, whereby the ultrasonic beam is radiated against a sample and a reflected wave of the thus-radiated ultrasonic beam is received by the element to convert the reflected wave into an electrical signal proportional to the reflected wave, characterized in that a mask is provided on a side of the sample relative to the acoustic lens, the mask is composed of an ultrasonic wave transmitting portion and an ultrasonic wave blocking portion, the ultrasonic wave transmitting portion permits the transmission of first components of the ultrasonic beam, said first beam components taking part in producing an elastic surface wave in one direction in a surface layer of the sample, and second components of the ultrasonic beam taking no part in the production of any elastic surface wave, and the ultrasonic wave blocking portion substantially reduces the transmission of third components of the ultrasonic beam, said third components taking part in producing elastic surface waves in directions other than said one direction in the surface layer of the sample.

An ultrasonic wave, which has been generated by the element, is caused to converge by the acoustic lens and is then radiated as a converging ultrasonic beam which converges at one point. Of the converging ultrasonic beam thus radiated only beam components which have reached the ultrasonic wave transmitting portion irradiate against the sample. The remaining beam components are attenuated or reflected by the ultrasonic wave blocking portion, so that they reach the sample as a weak ultrasonic wave or they do not reach the sample at all. As a result, the beam components which reach the ultrasonic wave blocking portion do not contribute to the measurement.

On the other hand, the ultrasonic wave transmitting portion permits transmission of beam components having an angle around the critical angle. When such beam components enter the sample, an elastic surface wave is developed in the surface layer of the sample. A reflected wave of the elastic surface wave again returns to the acoustic lens through the ultrasonic wave transmitting portion and then reaches the element. In this case, the reflected wave is a reflected wave of an elastic surface wave in one direction which is determined by the ultrasonic wave transmitting portion.

It is to be noted that the reflected wave is not a wave reflected in accordance with the surface shape of a material body upon entering of the incident wave through the surface of the material body but is a wave radiated from the surface of the specimen during propagation of the elastic surface wave through the surface of the sample. It is a return beam of the beam components impinged the sample, so that it can still be called a "reflected wave" in broad sense. The term "reflected wave" will therefore be used hereinafter.

Along with the reflected wave of the elastic surface wave, a reflected wave of beam components which passed at an angle smaller than the critical angle through the ultrasonic wave transmitting portion also reaches the element through the acoustic lens by way of the ultrasonic wave transmitting portion.

The above two reflected waves overlap and as an overlapped reflected wave (interfered wave), vibrate the element to output an electrical signal proportional to the magnitude of the interfered wave. By successively changing the distance between the probe and the sample, the amount of overlap of the two reflected waves varies so that the level of the electrical signal outputted from the element also varies. Eventually, a V(Z) curve in the direction determined by the ultrasonic wave transmitting portion can be obtained.

The probe of the present invention features the provision of the mask which permits transmission of components of a point-converging beam, said components taking part in the production of an elastic surface wave in one direction, and blocks transmission of other components taking part in the production of elastic surface waves in other directions. The probe of the present invention can therefore measure, in a specified direction, a very small area of a surface layer of a sample, whereby the accuracy of measurement can be significantly improved.

DESCRIPTION OF PREFERRED EMBODIMENT

The present invention will hereinafter be described on the basis of the embodiment shown in the accompanying drawings.

Figure 1:
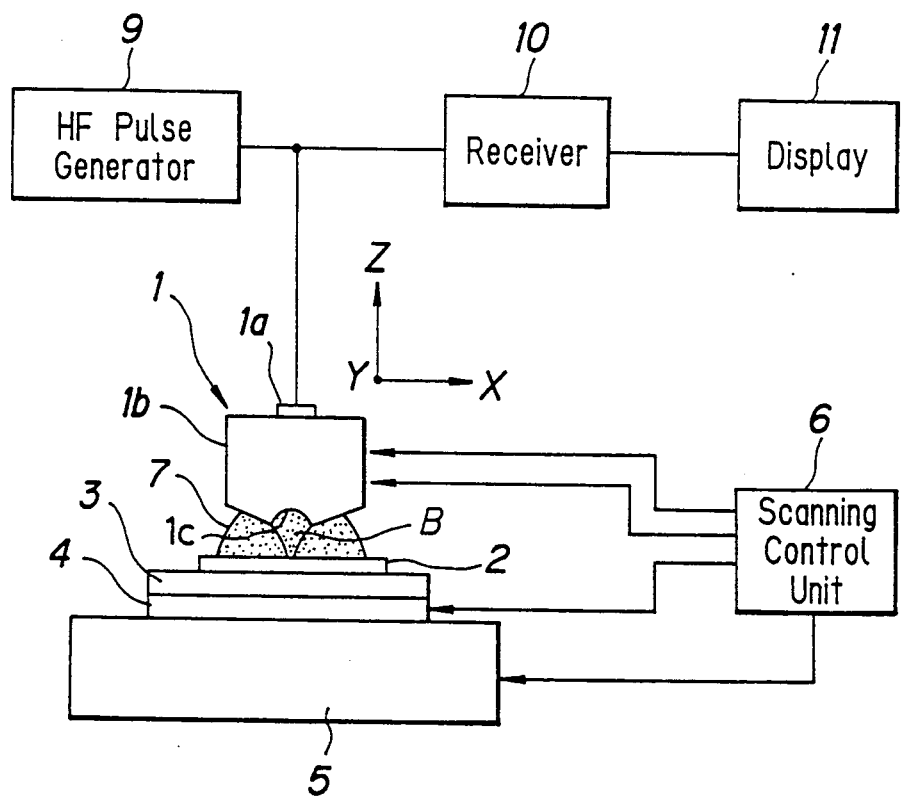
FIG. 1 is a simplified block diagram of a conventional ultrasonic microscope.
Figure 2:
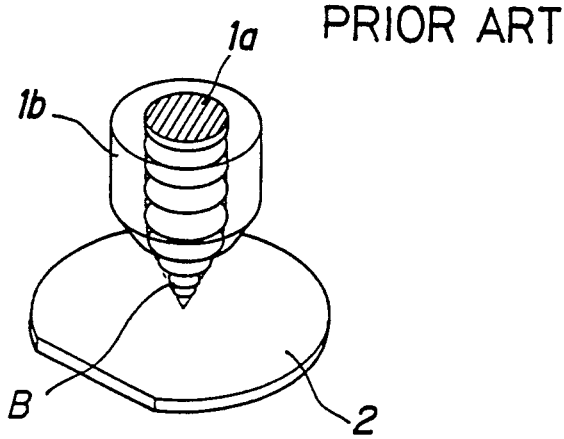
FIG. 2 is a perspective view of a probe shown in FIG. 1.
Figure 3:
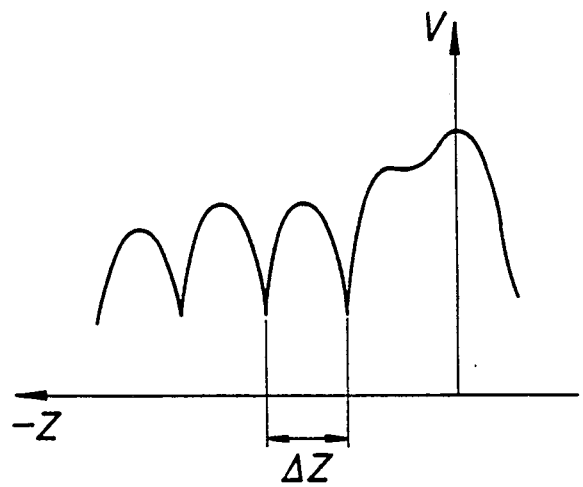
FIG. 3 is a waveform diagram of an ultrasonic signal obtained by moving the probe.
Figure 4:
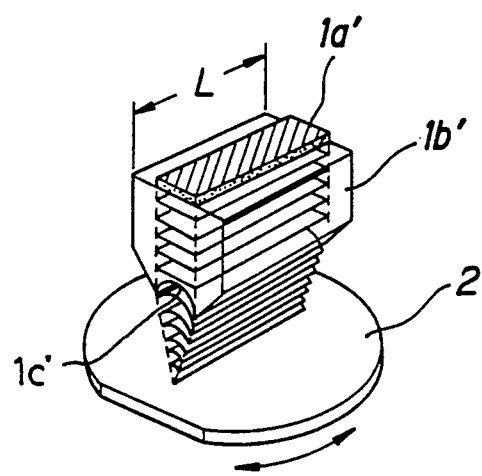
FIG. 4 is a perspective view of another probe.
Figure 5:
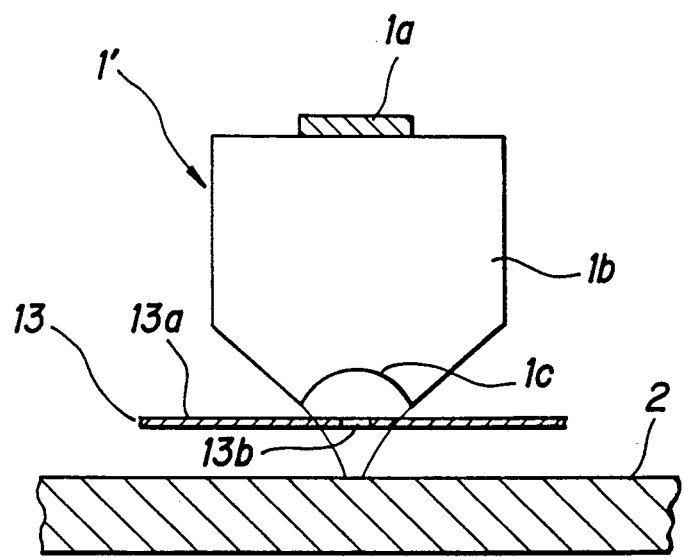
FIG. 5 is a fragmentary cross-sectional view of an ultrasonic microscope equipped with a probe according to one embodiment of the present invention, showing the probe, a sample and a vicinity area.

FIG. 5 is a cross-sectional view of a probe (sensor) according to one embodiment of the present invention as incorporated in an ultrasonic microscope. In the drawing, like elements to the corresponding elements in FIG. 1 are designated by like reference numerals or symbols and their description is omitted herein. Numeral 1' indicates the sensor according to the present embodiment, which is composed of a piezoelectric element 1a, an acoustic lens 1b having a lens surface 1c, and a mask 13. The mask 13 is constructed of a blocking portion 13a, which blocks or substantially reduces transmission of an ultrasonic wave, and a transmitting portion 13b which permits transmission of an ultrasonic wave.

Figure 6A:
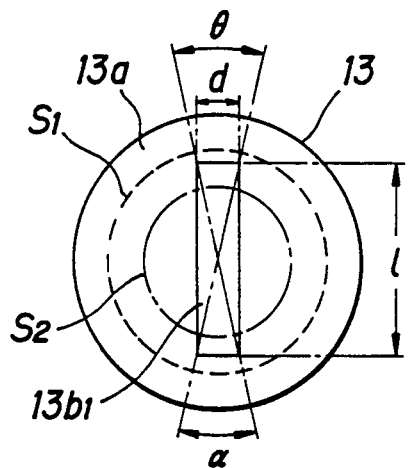
FIG. 6(a) through FIG. 6(f) are plan views of various modifications of a mask depicted in FIG. 5.

FIG. 6(a) through FIG. 6(f) are plan views of various variations of the shape of the transmitting portion of the mask illustrated in FIG. 5. FIG. 6(a) shows a mask 13 which has a blocking portion 13a and a rectangular transmitting portion $13b_1$. A circular contour $S_1$ indicated by broken line indicates the outer contour of components of a converging ultrasonic beam, which components were radiated from the acoustic lens 1b and have reached the mask 13. Further, another circular contour $S_2$ indicated by an alternate long and short dash line indicates the contour of components of the converging ultrasonic beam which components have impinged at a critical angle. The transmitting portion $13b_1$ of the mask 13 of according to the first modification has a length l and a width d. The length l is selected such that among beam components within the critical angle, incident waves and reflected waves within an angle $\alpha$ are allowed to transmit through the transmitting portion $13b_1$. On the other hand, the width d is chosen such that the other components of the beam components within the critical angle are blocked. When the mask 13 having such transmitting portion $13b_1$ is used, it is possible to obtain from the sample a reflected wave of an elastic surface wave propagating in the vertical direction as viewed in FIG. 6(a) and a reflected wave of incident waves having an angle smaller than the critical angle, thereby making it possible to collect information on the elastic surface wave in the direction of the single axis.

Figure 6B:
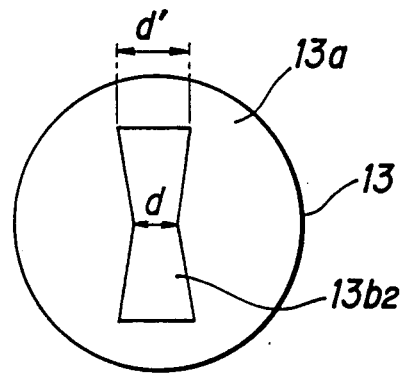

Another mask 13 shown in FIG. 6(b) has a transmitting portion $13b_2$, which is formed in a shape such that two trapezoids are combined together. Namely, the length and central width of the transmitting portion $13b_2$ are l and d, respectively and are the same as the length and width of the transmitting portion $13b_1$ depicted in FIG. 6(a). However, the width d' of both lengthwise end portions is set greater than the width d. More beam components are therefore allowed to impinge at the critical angle so that a greater degree of interference takes place. As a consequence, a still more distinct V(Z) curve can be obtained.

Figure 6C:
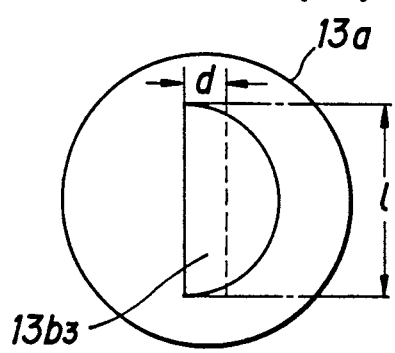

A further mask 13 depicted in FIG. 6(c) has a transmitting portion $13b_3$ formed in a substantially semi-circular shape. This transmitting portion $13b_3$ has a semicircular shape whose base is coincident with the left-hand [as viewed in FIG. 6(a)] longer edge of the two longer edges of the transmitting portion —$b_1$ shown in FIG. 6(a). The mask 13 has the same effects as the mask 13 shown in FIG. 6(a). Since ultrasonic beam components of the critical angle are prevented from entering from the side of the left-hand longer edge, no reflected ultrasonic wave of the critical angle takes place although the transmitting portion $13b_1$ is open in the semi-circular shape on the rigt-hand longer edge. There are ultrasonic beam comporents entering at the critical angle from the side of the right-hand longer edge. Reflected waves of these ultrasonic beam components are however blocked on the side of the left-hand longer edge.

Figure 6D:
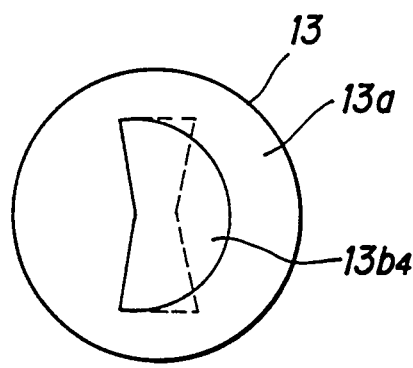

A still further mask 13 illustrated in FIG. 6(d) has a transmitting portion $13b_4$ formed in a substantially semi-circular shape. This transmitting portion $13b_4$ has been obtained by forming the right-hand edge of the transmitting portion $b_2$, as indicated by broken lines, into a semi-circular shape. For the same reasons as mentioned above with respect to the shape shown in FIG. 6(c), the transmitting portion $13b_4$ has the same effects as the transmitting portion $13b_2$ illustrated in FIG. 6(b).

Figure 6E:
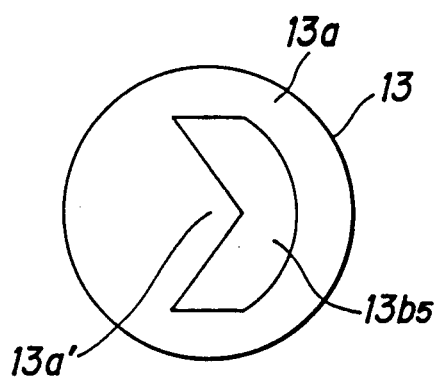

A still further mask 13 shown in FIG. 6(e) is formed in a similar shape to the transmitting portion 13b4 depicted in FIG. 6(d) except that a central part has been substantially squeezed. Namely, a portion 13a' of the blocking portion 13a significantly extends into the central part of a transmitting portion 13b5. As a consequence, ultrasonic beam components are prevented from transmitting through the central part. As a result, a reflected wave of ultrasonic beam components having an angle other than the critical angle is reduced and the relative reflection intensity of ultrasonic beam components of the critical angle therefore increases. It is thus possible to obtain a s&ill more distinct V(Z) curve.

Figure 6F:
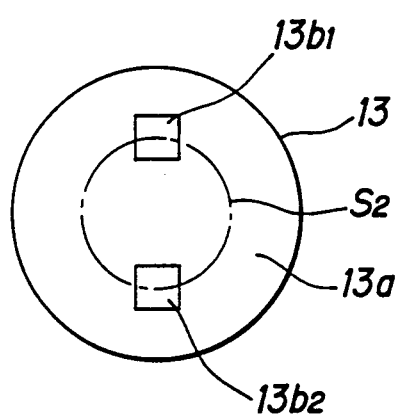

A still further mask 13 illustrated in FIG. 6(f) has two transmitting portions $13b_{61}, 13b_{62}$ on a vertical axis passing through the center of the mask 13 as viewed in the drawing. These transmitting portions are symmetrical to each other relative to the center. The transmitting portion of the mask 13 is similar to the transmitting portion $13b_1$ shown in FIG. 6(a) except that a central part of the transmittinq portion $13b_1$ has been formed as a blocking portion. Accordingly, the transmitting portions $13b_{61}, 13b_{62}$ permit transmission of incident waves and reflected waves of ultrasonic beam components impinged at the critical angle and of adjacent ultrasonic beam components. As a consequence, the elastic surface wave is emphasized further relative to the other waves compared with the mask 13 shown in FIG. 13(e).

A description will next be made of the structure of the mask 13 with reference to FIG. 7(a) through FIG. 7(e), which are enlarged fragmentary cross-sectional views of various specific examples of the structures of the blocking portion and transmitting portion of the mask 13. A mask 13 shown in FIG. 7(a) comprises a film $13a_1$ and a through-hole $13b_{100}$ bored through the film $13a_1$. The film $13a_1$ makes up the blocking portion $13a$ shown in FIG. 5, while the through-hole $13b_{100}$ forms the transmitting portion 13b. The film $13a_1$ is formed of a material, which has an acoustic impedance ($\rho c = 2.0$–$3.0$) closer to that of the medium (water) and can substantially attenuate ultrasonic waves. Exemplary materials having these properties include Saran[trade mark for poly(vinylidene chloride) and copolymers; products of Dow Chemical Co.λ-type resins, polyethylene and polystyrene. Because of the above-described properties of the film $13a_1$, ultrasonic beam components impinging the film $13a_1$ of the mask 13 are substantially unreflected and while passing through the film $13a_1$, are significantly attenuated. Reflected waves of ultrasonic beam components which have passed through the film $13a_1$ and entered the sample 2 also undergo substantial attenuation upon passage through the film $13a_1$. As a result, reflected wave components from the surface of the film $13a_1$ and those from the sample 2 by way of the film $13a_1$ are extremely reduced. Accordingly, reflected wave components returning to the acoustic lens 1b are practically only those passed through the through-hole $13b_{100}$.

Figure 7A:
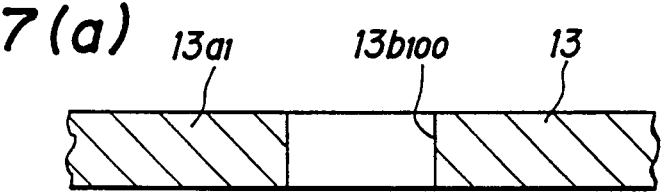
FIG. 7(a) through FIG. 7(e) are fragmentary cross-sectional views of various modifications of the mask.
Figure 7B:
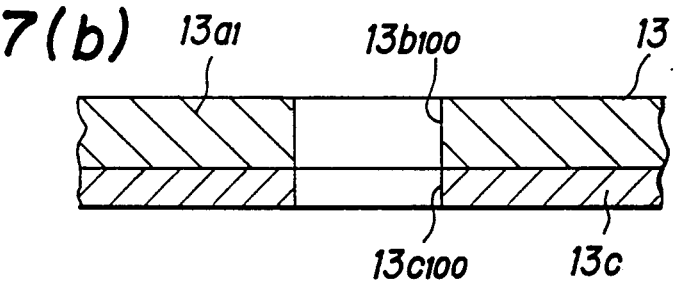

Another mask 13 depicted in FIG. 7(b) is formed of a film $13a_1$, which is of the same type as that shown in FIG. 7(a), and a metal foil 13c bonded to the film $13a_1$. Designated at symbol $13c_{100}$ is a through-hole formed through the metal foil 13c. The through-hole $13c_{100}$ is in registration with the through hole $13b_{100}$ of the film $13a_1$. As the metal foil 13c, any foil of a material which does not permit transmission of ultrasonic waves, has high rigidity and can be can be used. For example, a foil of a metal such as stainless steel or molybdenum can be used. Ultrasonic wave components entering through the film $13a_1$ are completely blocked by the metal foil 13c before they reach the sample 2. In addition, reflected wave components from the metal foil 13c are attenuated again while returning through the film $13a_1$. The provision of the metal foil 13c therefore allows the mask 13 to bring about the same advantageous effects as the mask 13 shown in FIG. 7(a) and in addition, imparts rigidity to the flexible film $13a_1$ to maintain the transmitting portion 13b (i.e., the through-hole $13b_{100}$) in a predetermined shape. There is a further advantage that the transmitting portion 13b can be formed by etching.

Figure 7C:
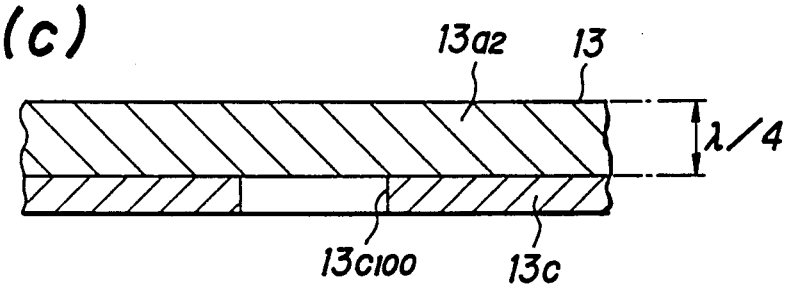

A further mask 13 illustrated in FIG. 7(c) comprises a film $13a_2$, which is free of any through-hole, and a metal foil 13c of the same type as that shown in FIG. 7(b). The metal foil 13c is bonded to the film $13a_2$. The film $13a_2$ is formed of the same material as the films $13a_1$ shown in FIGS. 7(a) and 7(b) but its thickness is set at λ/4, λ being the wavelength of an ultrasonic wave to be used. Where the thickness is λ/4 as in the present modification, the film exhibits good transmission of the ultrasonic beam. It is therefore unnecessary to form such a through-hole as the throughhole $13b_{100}$ shown in FIG. 7(b), whereby the mask can be fabricated easily.

Figure 7D:
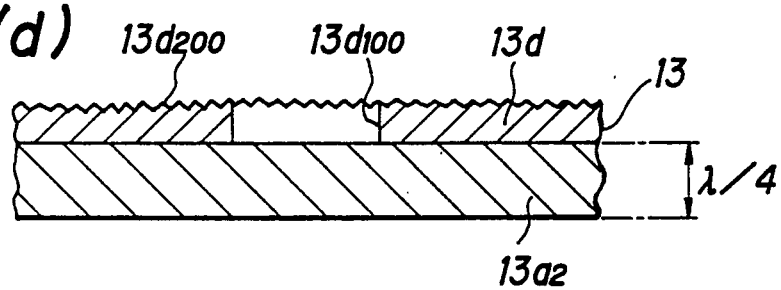

A still further mask 13 shown in FIG. 7(d) comprises a film $13a_2$, which is of the same type as the film shown in FIG. 7(c), and a metal foil 13d bonded to the upper surface of the film $13a_2$. The metal foil 13d is made of the same material as the metal foil 13c depicted in FIG. 7(c). There are also shown a throughhole $d_{100}$ formed as a transmitting portion through the metal foil 13d and a finely roughened surface $13d_{200}$ formed on the surface of the metal foil 13d. Ultrasonic beam components which have impinged at the mask 13 are irregularly reflected at the area other than the through-hole $13d_{100}$ by the finely roughened surface $13d_{200}$. The resulting irregularly-reflected ultrasonic wave components impinge in all directions at the acoustic lens 1b. Only an extremely small fraction of these impinging reflected ultrasonic wave components can reach the piezoelectric element 1a, so that the reflected ultrasonic wave components can be practically ignored and do not give any substantial influence to the signal to be produced by the piezoelectric element upon receipt of the reflected wave through the throughhole $13d_{100}$.

Figure 7E:
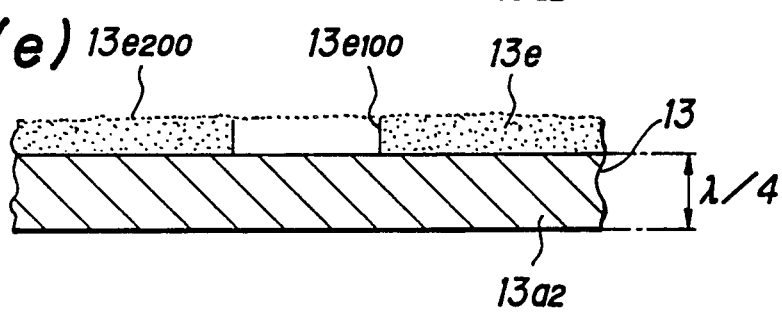

A still further mask 13 illustrated in FIG. 7(e) has a similar construction to the mask depicted in FIG. 7(d) except that a layer 13e of paste, starch, glue, adhesive or the like (hereinafter collectively called "glue layer") is bonded to the upper surface of the film $13a_2$ instead of the metal foil 13d. This glue layer 13e can be formed by coating the upper surface of the film $13a_2$ with a glue and then applying a roller to the resulting coating. Designated at symbol $13e_{100}$ is an opening formed through the layer 13e. By bonding the glue layer 13e, the glue layer 13e defines a roughened surface $13e_{200}$. The mask 13 of FIG. 7(e) can therefore exhibit the same effects as the mask shown in FIG. 7(d).

Figure 8:
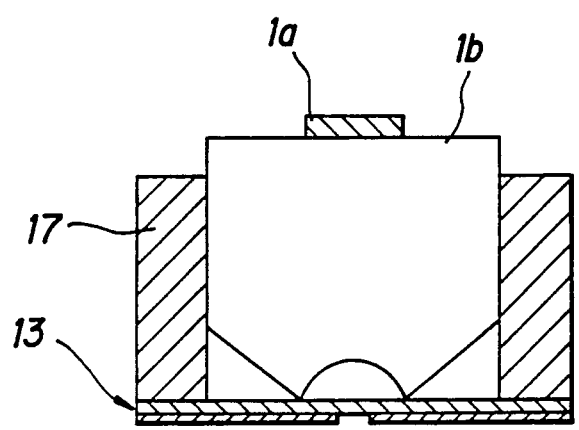
FIG. 8 is a cross-sectional view illustrating the attachment of the mask.

FIG. 8 is a cross-sectional view of a sensor, illustrating the manner of attachment of each of the masks 13 shown in FIGS. 6(a) through 7(e). In the drawing, there are depicted the piezoelectric element 1a, the acoustic lens 1b and the mask 13. Numeral 17 indicates a holder which is detachably mounted on the acoustic lens 1b. The mask 13 is fixed on a lower end face of the holder 17 as viewed in FIG. 8. Desired measurements can be performed, if holders 17 carrying masks 13 with transmitting portions 13b of various shapes are provided and those suited for the characteristics of the measurements are chosen and mounted on the acoustic lens 1b.

The mask 13 can be constructed by combining a desired one of the planar shapes for the blocking portion and transmitting portion, said shapes being shown in FIGS. 6(a) through 6(f) respectively, with a desired one of the structures illustrated in FIGS. 7(a) through (e). Taking by way of example a mask 13 having the planar shape shown in FIG. 6(a) and the structure depicted in FIG. 7(a), the operation of the present embodiment will be described.

Figure 9A:
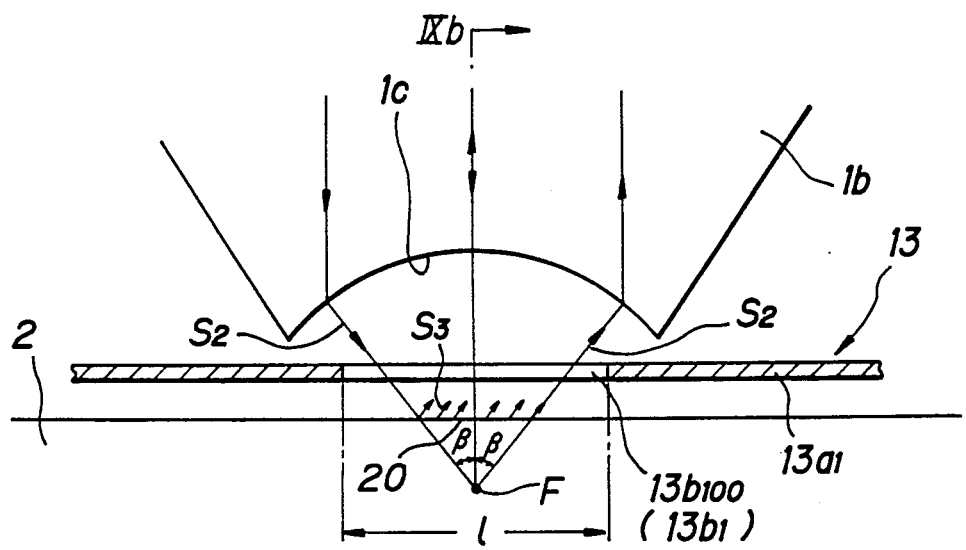
FIG. 9 (a) and FIG. 9(b) are enlarged fragmentary cross-sectional views showing the action of the mask.
Figure 9B:
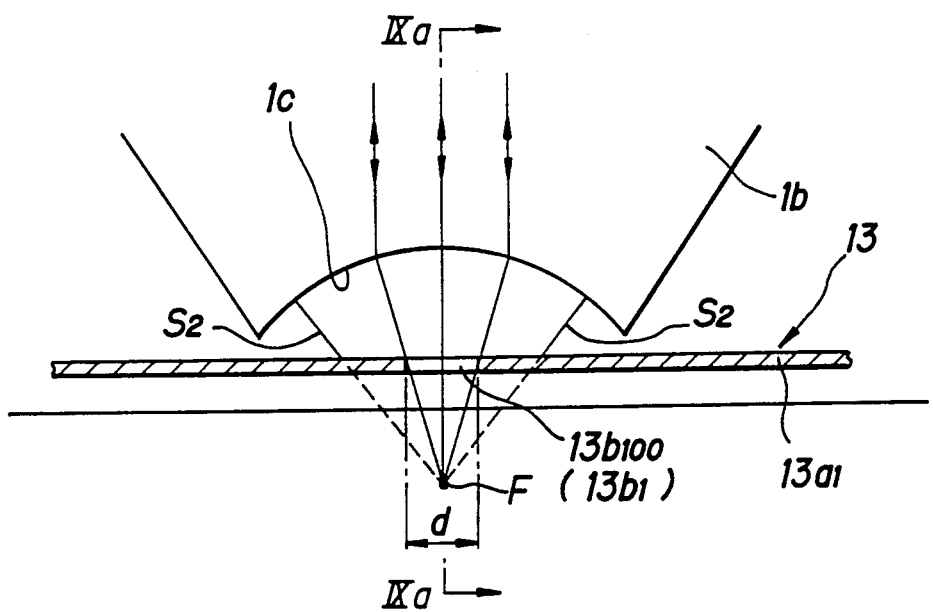

FIGS. 9(a) and 9(b) are enlarged fragmentary cross-sectional views of a free end portion of the acoustic lens 1b, the mask 13 and the sample 2. FIG. 9(a) has been taken in the direction of arrows IXa—IXa of FIG. 9(b), while FIG. 9(b) has been taken in the direction of arrows IXb—IXb of FIG. 9(a). In each of these drawings, like elements similar to the corresponding elements in FIGS. 5, 6(a) and 7(a) are identified by like reference numerals or symbols, and their description is omitted herein. Numeral 20 indicates a portion where an elastic surface wave is being produced in the surface layer of the sample 2. There are also illustrated a critical angle $\beta$ and a convergent point F of an ultrasonic beam.

When a prescribed voltage is applied to the piezoelectric element 1a, an ultrasonic beam which converges at the convergent point F and has a circular cross-section is radiated from the acoustic lens 1b. When this ultrasonic beam has reached the mask 13, the ultrasonic beam components which reach the blocking portion $13a_1$ are significantly attenuated while passing through the blocking portion $13a_1$. On the other hand, the ultrasonic beam components which reach the transmitting portion $13b_1$ are allowed to pass as they are. Accordingly, the ultrasonic beam which has passed through the mask 13 has a very small cross-section having substantially the same rectangular shape as the transmitting portion $13b_1$. Of this ultrasonic beam, the ultrasonic beam components in the direction of the length l of the transmitting portion $13b_1$ contain beam components having a critical angle $\beta$ as shown in FIG. 9(a), while the ultrasonic beam components in the direction of the width d of the transmitting portion $13b_1$ not contain any beam components having the critical angle $\beta$.

Of the ultrasonic beam components passed through the mask 13, those having an incident angle smaller than the critical angle $\beta$ return as waves reflected from the convergent point F, which is located within the sample 2, along the same paths as the incident paths. On the other hand, an ultrasonic beam $S_2$ which has impinged at the critical angle $\beta$ produces an elastic surface wave in the portion 20 of the sample 2 as illustrated in FIG. 9(a). From the surface of the portion 20, reflected waves $S_3$ are then successively given off by the elastic surface wave as indicated by arrows. When these reflected waves $S_3$ have entered the acoustic lens 1b, only the reflected wave $S_3$ which travels along a reflection path located at a position symmetrical with the incident path is allowed to reach the piezoelectric element 1a. The other reflected waves $S_3$ are reflected in directions different from the piezoelectric element 1a and do not reach the piezoelectric element 1a. A similar phenomenon also takes place with respect to an ultrasonic beam of a critical angle in a direction opposite to the direction of the critical angle shown in the drawing.

The present embodiment can obtain a V(Z) curve in the direction of a specific axis because the embodiment can produce an ultrasonic beam of the critical angle only in the direction of the length of the transmitting portion. Moreover, the present embodiment permits measurement of a very small area owing to the use of an ordinary ultrasonic beam which converges at one point.

In the description of the above embodiment, plural holders with different masks fixed thereon were provided in advance and a suitable one of these holders was chosen upon measurement. It is however necessary to provide only one holder if the holder and masks are designed in such a way that the masks are detachably mounted on the holder. Further, extremely efficient measurement is feasible provided that transmitting portions of different shapes are formed in a mask and the mask and an associated holder are designed in such a way that the mask is movable in X-Y plane relative to the holder.

What is claimed is:

1. In a probe for an ultrasonic microscope, said probe having an element for radiating and receiving an ultrasonic wave and an acoustic lens for causing an ultrasonic wave, which has been generated by the element, to converge at a point into an ultrasonic beam, whereby the ultrasonic beam is radiated against a sample and a reflected wave of the thus-radiated ultrasonic beam is received by the element to convert the reflected wave into an electrical signal proportional to the reflected wave, the improvement wherein a mask is provided on a side of the sample relative to the acoustic lens, the mask is composed of an ultrasonic wave transmitting portion and an ultrasonic wave blocking portion, the ultrasonic wave transmitting portion permits the transmission of first components of the ultrasonic beam, said first beam components taking part in producing an elastic surface wave in one direction in a surface layer of the sample, and second components of the ultrasonic beam taking no part in the production of any elastic surface wave, and the ultrasonic wave blocking portion substantially reduces the transmission of third components of the ultrasonic beam, said third components taking part in producing elastic surface waves in directions other than said one direction in the surface layer of the sample.

2. The probe of claim 1, wherein the ultrasonic wave blocking portion is a member through which an ultrasonic wave is substantially attenuated; and the ultrasonic wave transmitting portion is a through-hole bored through the member.

3. The probe of claim 1, wherein the ultrasonic wave blocking portion comprises a member, through which an ultrasonic wave is substantially attenuated, and a metal film provided on one side of the member, said one side being on the side of the sample; and the ultrasonic wave transmitting portion comprises a first through-hole and a second through-hole bored through the member and the metal film, respectively.

4. The probe of claim 1, wherein the ultrasonic wave blocking portion comprises a member having only a small difference in acoustic impedance from a medium interposed between the acoustic lens and the sample and a metal film provided on a side of the member, said side being one the side of the sample; and the ultrasonic wave transmitting portion comprises an opening formed by removing a portion of the metal film.

5. The probe of claim 1, wherein the ultrasonic wave blocking portion comprises at least one side of the mask, said one side facing the side of the acoustic lens and defining an irregular reflection surface; and the ultrasonic wave transmitting portion is free of the irregular reflection surface.

6. The probe of claim 5, wherein the ultrasonic wave transmitting portion is formed by a through-hole.

7. The probe of claim 5, wherein the ultrasonic wave transmitting portion is a member having only a small difference in acoustic impedance from a medium interposed between the acoustic lens and the sample.

8. The probe of claim 1, wherein the ultrasonic wave transmitting portion has a elongated rectangular shape.

9. The probe of claim 1, wherein the ultrasonic wave transmitting portion has a shape which is narrower at a central portion and wider at both lengthwise end portions symmetrical to each other with respect to the central portion.

10. The probe of claim 1, wherein the ultrasonic wave transmitting portion has a substantially semicircular shape.

11. The probe of claim 1, wherein the ultrasonic wave transmitting portion has a substantially crescentic shape.

12. The probe of claim 1, wherein the ultrasonic wave transmitting portion comprises at least one pair of ultrasonic wave transmitting sub-portions arranged at symmetrical positions with an interval therebetween.

* * * * *